US012438586B2

United States Patent
Nilsson et al.

(10) Patent No.: US 12,438,586 B2
(45) Date of Patent: Oct. 7, 2025

(54) METHOD AND A NETWORK NODE FOR MUTING ANTENNA ELEMENTS OF AN ACTIVE ANTENNA SYSTEM

(71) Applicant: Telefonaktiebolaget LM Ericsson (publ), Stockholm (SE)

(72) Inventors: Andreas Nilsson, Gothenburg (SE); Fredrik Athley, Kullavik (SE); Martin Johansson, Mölndal (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 210 days.

(21) Appl. No.: 17/724,935

(22) Filed: Apr. 20, 2022

(65) Prior Publication Data
US 2022/0352957 A1    Nov. 3, 2022

Related U.S. Application Data

(63) Continuation of application No. 16/071,747, filed as application No. PCT/EP2016/051457 on Jan. 25, 2016, now abandoned.

(51) Int. Cl.
| | | |
|---|---|---|
| H04B 7/06 | (2006.01) | |
| H01Q 3/24 | (2006.01) | |
| H04B 7/08 | (2006.01) | |
| H04W 52/02 | (2009.01) | |

(52) U.S. Cl.
CPC ............ H04B 7/0693 (2013.01); H01Q 3/24 (2013.01); H04B 7/0877 (2013.01); H04W 52/0206 (2013.01); Y02D 30/70 (2020.08)

(58) Field of Classification Search
CPC ...... H04B 7/0693; H04B 7/0877; H01Q 3/24; H04W 52/0206; Y02D 30/70
See application file for complete search history.

(56) References Cited

U.S. PATENT DOCUMENTS

| | | | |
|---|---|---|---|
| 6,504,517 B1 | 1/2003 | Liu et al. | |
| 9,647,335 B1 * | 5/2017 | Tujkovic | .................. H01Q 3/34 |
| 2006/0038738 A1 * | 2/2006 | Shtrom | ..................... H01Q 3/24 |
| | | | 343/893 |

(Continued)

OTHER PUBLICATIONS

International Search Report and Written Opinion dated Sep. 27, 2016 issued in International Patent Application No. PCT/EP2016/051457. (9 pages).

(Continued)

*Primary Examiner* — Yuwen Pan
*Assistant Examiner* — Fatuma G Sherif
(74) *Attorney, Agent, or Firm* — Rothwell, Figg, Ernst & Manbeck, P.C.

(57) ABSTRACT

A method performed in a network node of a communication system for muting antenna elements of an active antenna system. The method comprises determining, based on a priori information relating to performance of the communication system, an antenna element separation between one or more pairs of active antenna elements of at least a subset of all active antenna elements of the active antenna system; and muting at least one antenna element such that the determined antenna element separation is obtained between each of the one or more pairs of active antenna elements of at least the subset of all active antenna elements.

16 Claims, 6 Drawing Sheets

(56) References Cited

U.S. PATENT DOCUMENTS

| | | |
|---|---|---|
| 2008/0158054 A1 | 7/2008 | Yong |
| 2012/0165063 A1* | 6/2012 | Scalia .................. H04B 7/0608 |
| | | 455/517 |
| 2012/0200459 A1* | 8/2012 | Park ..................... H04B 7/0634 |
| | | 342/373 |
| 2012/0307739 A1 | 12/2012 | Ishihara et al. |
| 2012/0315948 A1 | 12/2012 | Frenger |

OTHER PUBLICATIONS

Holtkamp et al., "Minimizing Base Station Power Consumption", IEEE Journal on Selected Areas in Communications, vol. 32, No. 2 (Feb. 2014). (10 pages).

Hedayati et al., "Reducing Energy Consumption Through Adaptation of Number of Active Radio Units", IEEE, 978-1-4244-8331-0/11 (2011). (5 pages).

Skillermark et al., "Enhancing Energy Efficiency in LTE with Antenna Muting", IEEE, 978-1-4673-0990-5/12 (2012). (5 pages).

\* cited by examiner

METHOD AND A NETWORK NODE FOR MUTING ANTENNA ELEMENTS OF AN ACTIVE ANTENNA SYSTEM

CROSS-REFERENCE TO RELATED APPLICATIONS

This application is a continuation of U.S. application Ser. No. 16/071,747 filed on Jul. 20, 2018, which was the National Stage of International Patent Application No. PCT/EP2016/051457, filed on Jan. 25, 2016. The above identified applications are incorporated by this reference.

TECHNICAL FIELD

The technology disclosed herein relates generally to the field of wireless communications systems, and in particular to a method, a network node, computer program and computer program products for muting antenna elements of an active antenna system.

BACKGROUND

The use of communication devices and wireless broadband has increased rapidly during the last decade, and is expected to grow even faster coming years. To meet these demands network capacity has to be increased, and this demand should be met while considering the energy consumption, since energy efficiency is an important criterion for future networks.

One efficient way to increase the capacity in the network is to deploy active antennas for user-specific beamforming (BF). The more antenna elements in the array the higher order of beamforming can be applied. The beamforming permits multiple data streams to use same frequencies at the same time, giving a way to increase the capacity. Simulations have shown that the capacity can be increase with 30% for each doubling of number of elements in the active antenna array. Another way to increase the capacity in the network is to increase the number of radio access nodes (e.g. base stations) and use smaller cells, whereby a more efficient spatial reuse can be obtained and the capacity hence be increased. However, with many cells and denser deployment of base stations the energy consumption would increase in the network, being both costly and having a negative effect on the environment.

The capacity need in networks varies and during non-busy hours the base station utilization in the network typically is very low. The base stations consume much power even though there is no data transmitted. Studies have shown that at zero base station utilization the base station still consumes more than half of the power consumption at 100% base station utilization. Large part of the zero load power consumption is due to the radio chains consuming much power even though no data is transmitted. Studies have also shown promising results when muting, i.e. turning off, one or several antenna ports/antenna elements and their corresponding radio in order to save energy.

From the above it is clear that an increased network capacity and reduced energy consumption are important for future networks and ways for meeting these requirements are therefore desirable.

SUMMARY

An objective of the present teachings is to enable reduced energy consumption in a network. Another objective is to provide an improved way of muting antenna elements, whereby a total energy consumption in a network may be reduced. Another objective is to enable the energy saving by the muting of antenna elements without increasing interference.

The objective is according to an aspect achieved by a method performed in a network node of a communication system for muting antenna elements of an active antenna system. The method comprises determining, based on a priori information relating to performance in the communication system, an antenna element separation between one or more pairs of active antenna elements of at least a subset of all active antenna elements of the active antenna system, and muting at least one antenna element such that the determined antenna element separation is obtained between each of the one or more pairs of active antenna elements of at least the subset of all active antenna elements.

An advantage of the method is that system performance, e.g. in terms of energy savings and system throughput, is improved compared to known methods for antenna element muting. For a given performance requirement, a higher number of antenna elements can be muted compared to the known methods, and hence a higher reduction in energy consumption is achieved.

The objective is according to an aspect achieved by a computer program for a network node for muting antenna elements of an active antenna system. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node of a communication system for muting antenna elements of an active antenna system. The network node is configured to determine, based on a priori information relating to performance in the communication system, an antenna element separation between one or more pairs of active antenna elements of at least a subset of all active antenna elements of the active antenna system, and mute at least one antenna element such that the determined antenna element separation is obtained between each of the one or more pairs of active antenna elements of at least the subset of all active antenna elements.

Further features and advantages of the present teachings will become clear upon reading the following description and the accompanying drawings.

DETAILED DESCRIPTION

Figure 1:
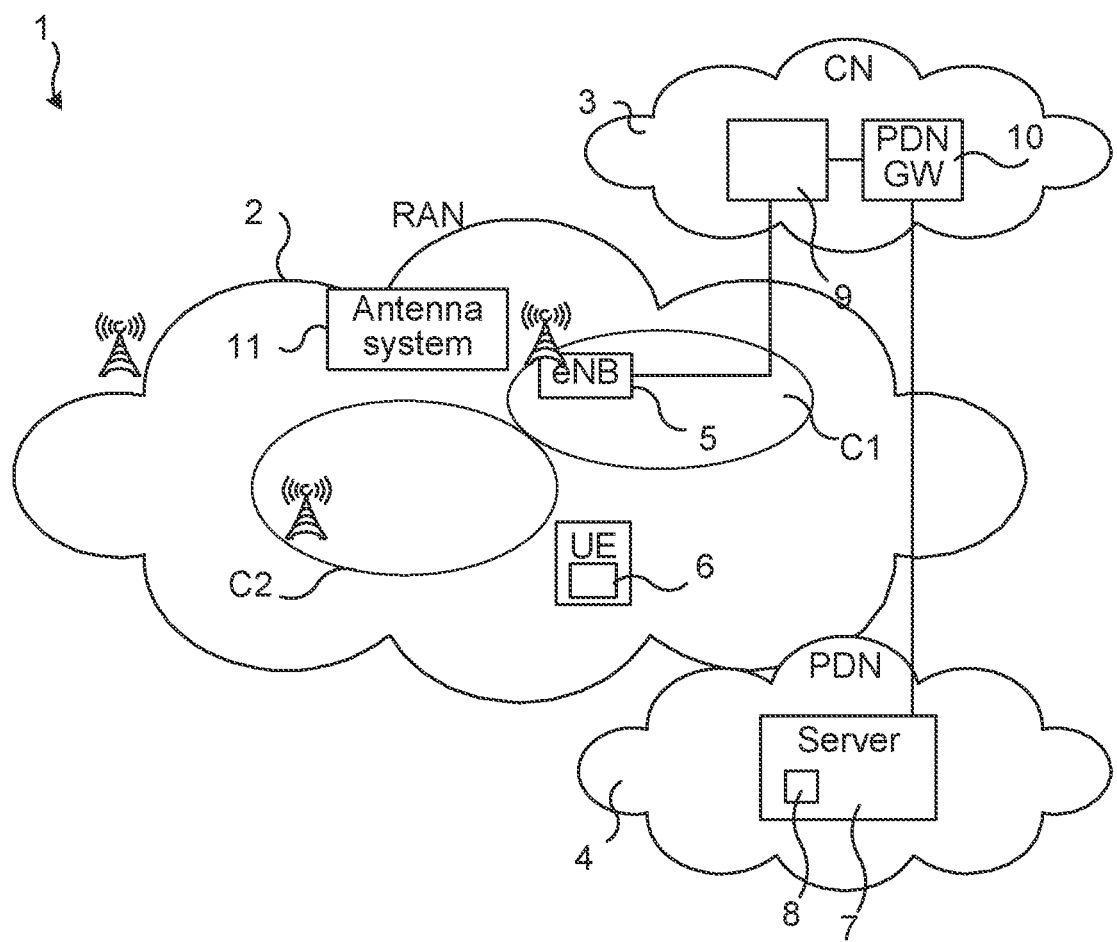
FIG. 1 illustrates schematically an environment in which embodiments of the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, according to the present teachings the separation between antenna elements, in the following also denoted element separation, is considered when performing antenna muting in order to save energy. The performance of communication device-specific beamforming depends on the separation of the antenna elements of an active antenna. Optimal element separation in turn depends on how the base station is deployed and how the surroundings are. In view of these aspects, the present teachings suggest, in various embodiments, that when performing antenna muting, the antenna elements are muted such that the remaining (active) elements get an element separation that maximizes the performance of the system. Which element separation that is best for a certain base station is considered and may depend on various circumstances, for example the orientation of the active antenna array, the placement of the base station, the surrounding deployment (e.g. placement of neighboring base stations) etc. The present teachings suggest several ways to find an appropriate element separation for a base station. For instance, prior knowledge about the antenna deployment may be used or the base station may test different element separations and log the performance for each element separation and after having gathered enough statistics the element separation that gives best performance may be selected.

FIG. 1 illustrates an environment in which embodiments of the present teachings may be implemented. In particular, a communication system 1 is illustrated comprising a radio access network (RAN) 2 and a core network (CN) 3. An external packet data network (PDN) 4 is also illustrated.

The RAN 2 comprises one or more radio access nodes 5, which may be denoted differently, e.g. base station, evolved NodeB, or eNB to mention a few examples. The radio access node 5 provides wireless communication for communication devices 6 (in the following exemplified by user equipment, UE) residing within its coverage area. In this context it is noted that one such radio access node 5 may control several geographical areas, e.g. cells or sectors. Each such radio access node 5 may comprise and/or control an antenna system 11. The antenna system 11 may comprise an active antenna system. In an active antenna system each antenna (radiating) element in a (phased) antenna array is connected to separate radio frequency (RF) components, such as power amplifiers and transceivers. This enables individual phase and amplitude control. Signal processing can be used to shape and steer radiated beam patterns, e.g. vertically and horizontally (vertical beamforming and horizontal beamforming). Beams can be created and steered e.g. within one cell. By such active antenna system 11 UE specific beam forming may be applied, aperture reused sectorization, Multi-User multiple-input and multiple-output (MU-MIMO) technologies and various other features.

The CN 3 comprises various network nodes, which may also be denoted differently depending on communication system at hand. In LTE, for instance, the CN 3 may comprise entities such as a Mobility Management Entity (MME) 9 and packet data network gateways (PDN GW) 10 providing connectivity to e.g. the PDN 4.

The communication system 1 may comprise or be connectable to a PDN 4, which in turn may comprise a server 7 or cluster of servers, e.g. a server of the Internet ("webserver") or any application server. Such server 7 may run applications 8. It is noted that some embodiments according to the present teachings may be implemented in a distributed manner, wherein different steps are performed by different entities, and may be implemented locally and/or in a centralized component (e.g. in a so called cloud environment). The network node in which a method according to the teachings may be implemented may comprise a server or other entity on the Internet e.g. according to a cloud computing model.

Figure 2:
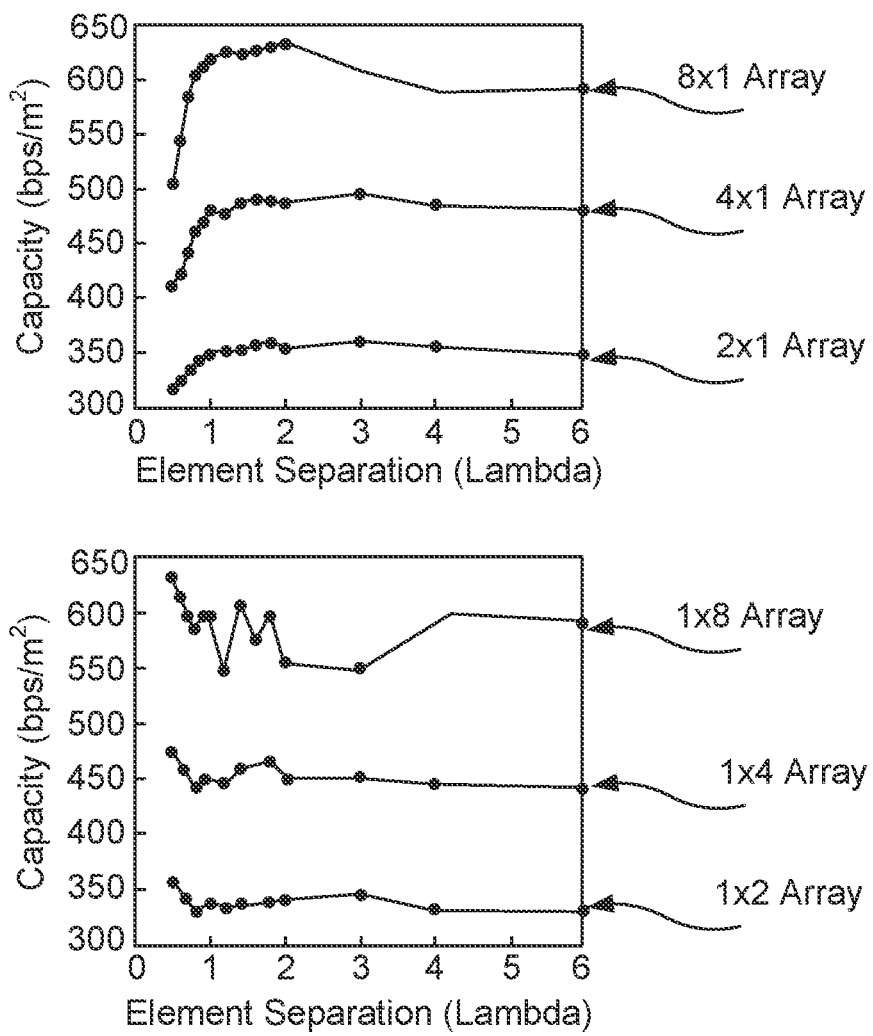
FIG. 2 illustrates simulation results on downlink capacity as function of element separation.

FIG. 2 illustrates simulation results on downlink capacity as function of element separation. The simulations were performed for a realistic urban Asian scenario in which UE-specific beamforming was applied. It is noted that in all simulations, regardless of number of used elements, the total output power is the same (40 W). Therefore, if a certain output power is assumed per power amplifier (PA), the performance should not be compared for different numbers of antenna elements in the array. For instance, the performance of the 1×8 array cannot be compared with the performance of the 1×2 array, because they have different output power per PA. However, different antenna separations with the same number of antenna elements in the array are comparable. For instance, different points on the curve for the 1×2 array can be compared to all the other points of this curve. From the denotation "a×b array" the number and placement of the antenna elements can be deduced. For instance, 2×1 array is a vertical array with 2 elements (the array comprises one column and two rows, i.e. two elements one above the other in the vertical direction) while a 1×2 array is a horizontal array with two elements (the array comprises two columns and one row, i.e. the array comprises two elements side by side in the horizontal direction).

The simulation results of FIG. 2 show that the element separation has a large effect on the system performance. As can be seen in the graphs, the downlink capacity in the simulated urban Asian scenario changes with element separation for vertical arrays (upper graph of FIG. 2) as well as for horizontal arrays (lower graph of FIG. 2). In particular, for this specific scenario the dependence between capacity and element separation for the vertical array is especially strong. What can also be seen is that the typical half a wavelength separation between the elements gives significantly lower capacity than around one wavelength between the elements. In the simulations cell specific reference signals (CRSs), used by UEs for cell selection, are transmitted on element patterns.

Figures 3A, 3B:
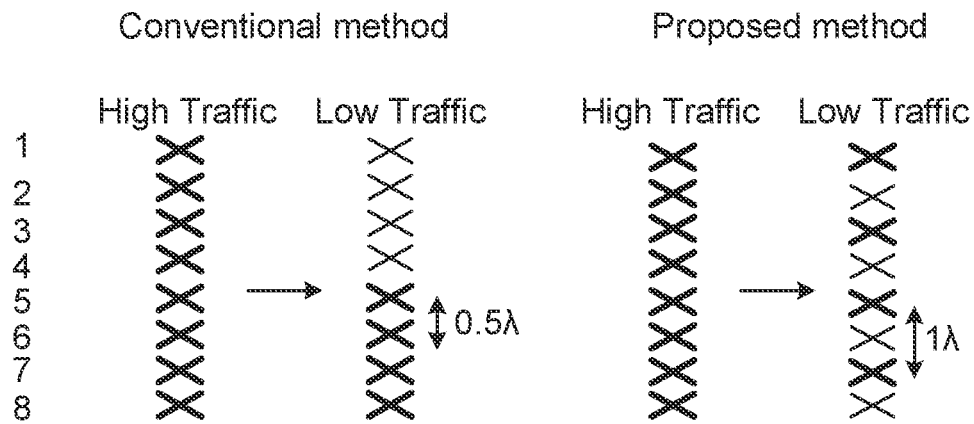
FIGS. 3a and 3b illustrate a conventional method of muting antenna elements and a method of muting antenna elements according to the present teachings, respectively.

FIGS. 3a and 3b illustrate a conventional method of muting antenna elements (FIG. 3a) and a method of muting antenna elements according to the present teachings (FIG. 3b). Regarding muting of antenna elements according to prior art, it is conventionally simply assumed that the best performance is obtained when keeping the antenna elements close to each other, and the conventionally used antenna element separation is hence typically around 0.5λ.

An active antenna system 11 with a vertical array comprising eight antenna elements with antenna element separation of 0.5 is used as an example in the following. The antenna elements are numbered from top down, i.e. the uppermost antenna element is denoted first antenna element, the next antenna element from the top is denoted second etc. until the bottommost antenna element, which is denoted eight antenna element. This numbering is also indicated at the leftmost part of FIG. 3a. When the traffic goes down from "high traffic" to "low traffic" it may be possible to mute a number of the antenna elements in order to save energy, while still maintaining sufficient performance in the network. The performance may be measured according to some key performance indicator (KPI) defined by the operator of the network. As an example for comparing the known, conventional method to the herein proposed method it is assumed that the traffic load is reduced from a maximum traffic load and that this in turn means that it is possible to turn off four of the eight antenna elements while still maintaining good enough performance in the network.

The conventional method, illustrated in FIG. 3a, hence comprises just turning off the four antenna elements from the top, i.e. elements numbered 1 to 4 (or from the bottom, elements numbered 8 to 5) to keep an antenna element distance of 0.5λ. That is, when going from the high-traffic scenario to the low-traffic scenario, the first through fourth antenna elements are turned off. In contrast, the method according to the present teachings for muting antenna elements, illustrated in FIG. 3b, comprises determining an antenna element separation that maximizes the performance. In the illustrated case, the antenna element separation that maximizes the performance is, in this case, determined to be 1λ, and the second, fourth, sixth and eighth antenna elements may therefore be turned off, giving the determined antenna element separation.

How to determine the antenna element separation that maximizes the performance is described and exemplified next. Finding the appropriate antenna element separations for each cell may be done in a number of different ways. In common for the embodiments is that the determination is based on a priori information, i.e. information gathered beforehand, which information relates to the performance in the communication system 1 or part thereof (e.g. performance in a cell C1, C2 or in two cells of the communication system 1).

A first way is to use prior knowledge of the network deployment to find the appropriate antenna element separation, e.g. how and where the active antenna system 11 is placed and located. As has been shown, a vertical array may not give the same performance in the communication system 1 as a horizontal array (see e.g. FIG. 2 and related description). Further, placing the active antenna system 11 at a high location (e.g. roof top) may give different performance than placing it on a wall. Such network deployment issues may hence be used. For instance, it may be assured that the grating lobes of the desired main beam fall outside the angular region of UEs served by other cells. This ensures that the interference is kept at a minimum. In terms of performance (or performance requirement) in the communication system 1 this may correspond to maximum interference that can be tolerated while still meeting e.g. a certain user data rate. By selecting another antenna element separation, even although involving a higher number of active antennas, the interference may instead increase as a neighboring base station might need to increase its transmission power for these interfered UEs. The total energy consumption in the communication system 1 might then increase, despite the antenna muting of another base station and/or cell. The approximate locations of UEs may be determined in known manner, e.g. using triangulation based on signal strength or timing advance. This deployment dependent selection is exemplified and explained later in relation to FIG. 6.

Another way is to perform measurements in order to find directions of served and interfered UEs and use this knowledge to find appropriate element separations. Patterns of user behavior can, for instance, be determined by logging data corresponding to user positions, traffic demands etc., which could be calculated in the network.

Still another way to find appropriate antenna element separations, and hence a priori information on performance in the communication system 1, is to test different element separations per cell during antenna muting, gather performance statistics and when enough statistics have been gathered choose the antenna element separation that gave the best performance. If changes to the environment occur, for instance if high buildings are built in the environment, then the statistic gathering may need to be performed again.

Figure 4:
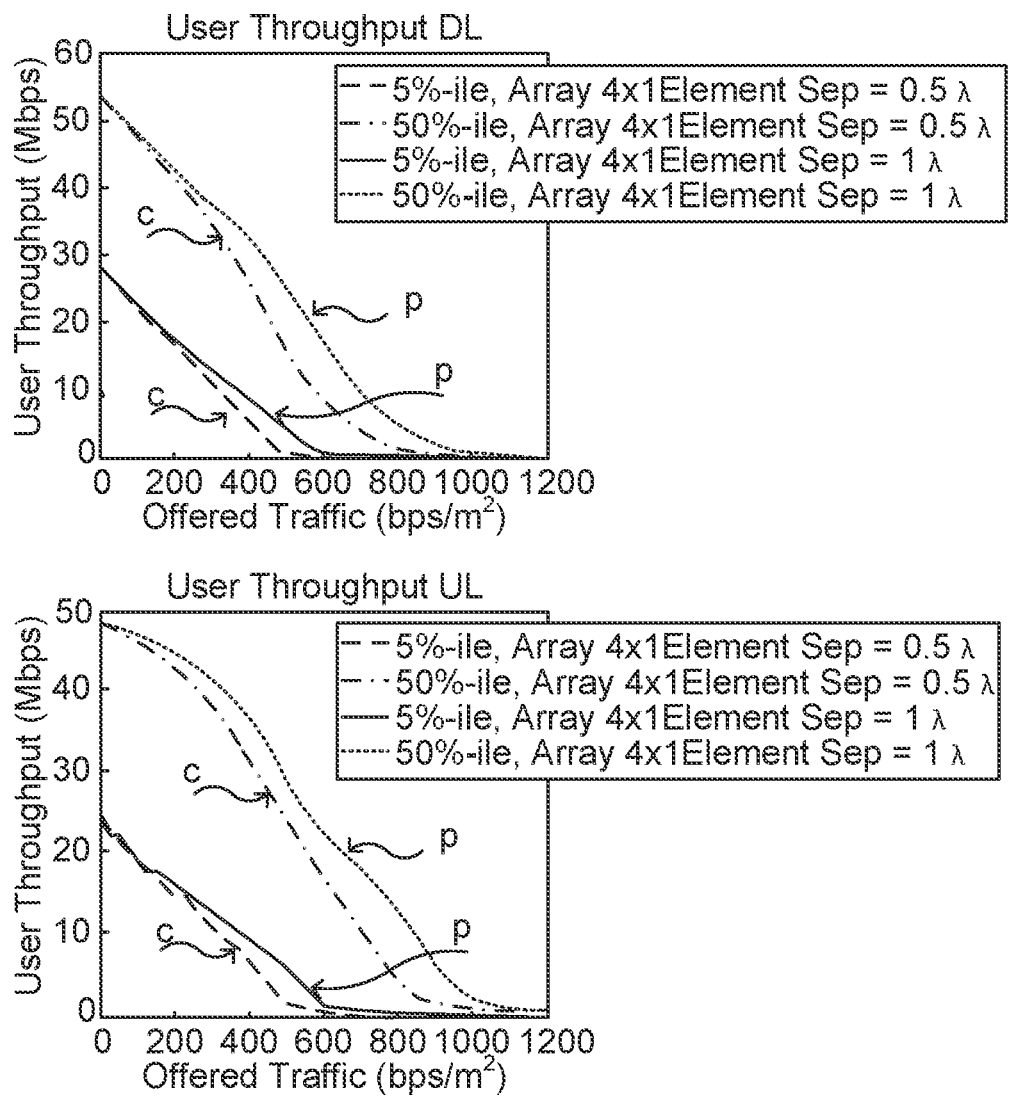
FIG. 4 illustrates simulation results for a conventional method and a method according to the present teachings.

FIG. 4 illustrates the throughput for downlink and uplink as a function of traffic load for the conventional method and the method according to the present teachings, respectively, for a 4×1 antenna array. That is, this corresponds to the situation of FIG. 3 when the reduced traffic load can still be met although muting four of eight antenna elements. The arrows denoted "c" indicate the results when using the conventional method, for 5%-ile and 50%-ile with antenna element separation of 0.5λ. The arrows denoted "p" indicate the results when using the herein proposed method, also for 5%-ile and 50%-ile with antenna element separation λ. As can be seen the throughput is higher at basically all traffic loads for the method according to the present teachings compared to the conventional method.

Assuming next that the traffic load reduces even further and that it is now possible to have six of the eight antenna elements turned off, while still maintaining high enough performance in the network.

Figures 5A, 5B:
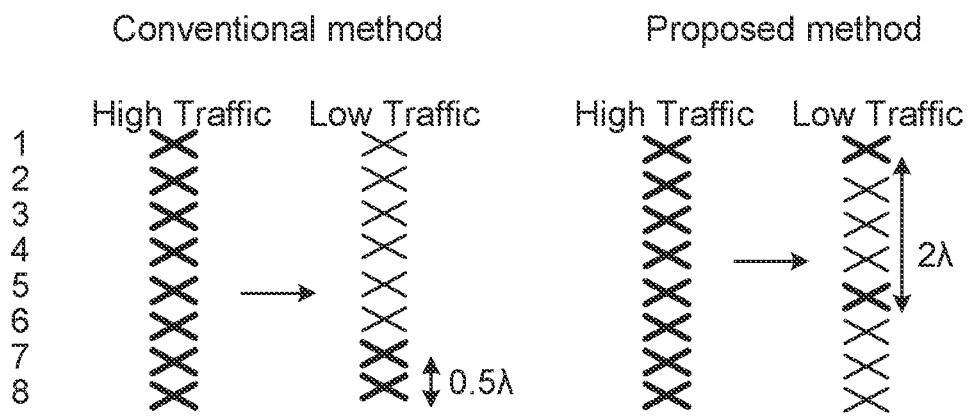
FIGS. 5a and 5b illustrate a conventional method of muting antenna elements and a method of muting antenna elements according to the present teachings, respectively.

FIGS. 5a and 5b illustrate the above scenario, and in particular how the muting of antenna elements is done for the conventional method (FIG. 5a) and the method according to the present teachings (FIG. 5b), respectively. The respective low traffic antenna settings of FIGS. 3a and 3b are the starting points here. The conventional method, FIG. 5a, simply turns off two additional antenna elements by turning off the uppermost of the currently active antenna elements, i.e. fifth and sixth antenna elements, thus keeping the antenna element separation of 0.5λ. In contrast to this, the current method determines that an antenna element separation of 2λ would now be the most appropriate selection for the current scenario, and hence turns off the third and seventh antenna elements, leaving only the first and the fifth antenna elements active and having the determined antenna element separation of 2λ.

Figure 6:
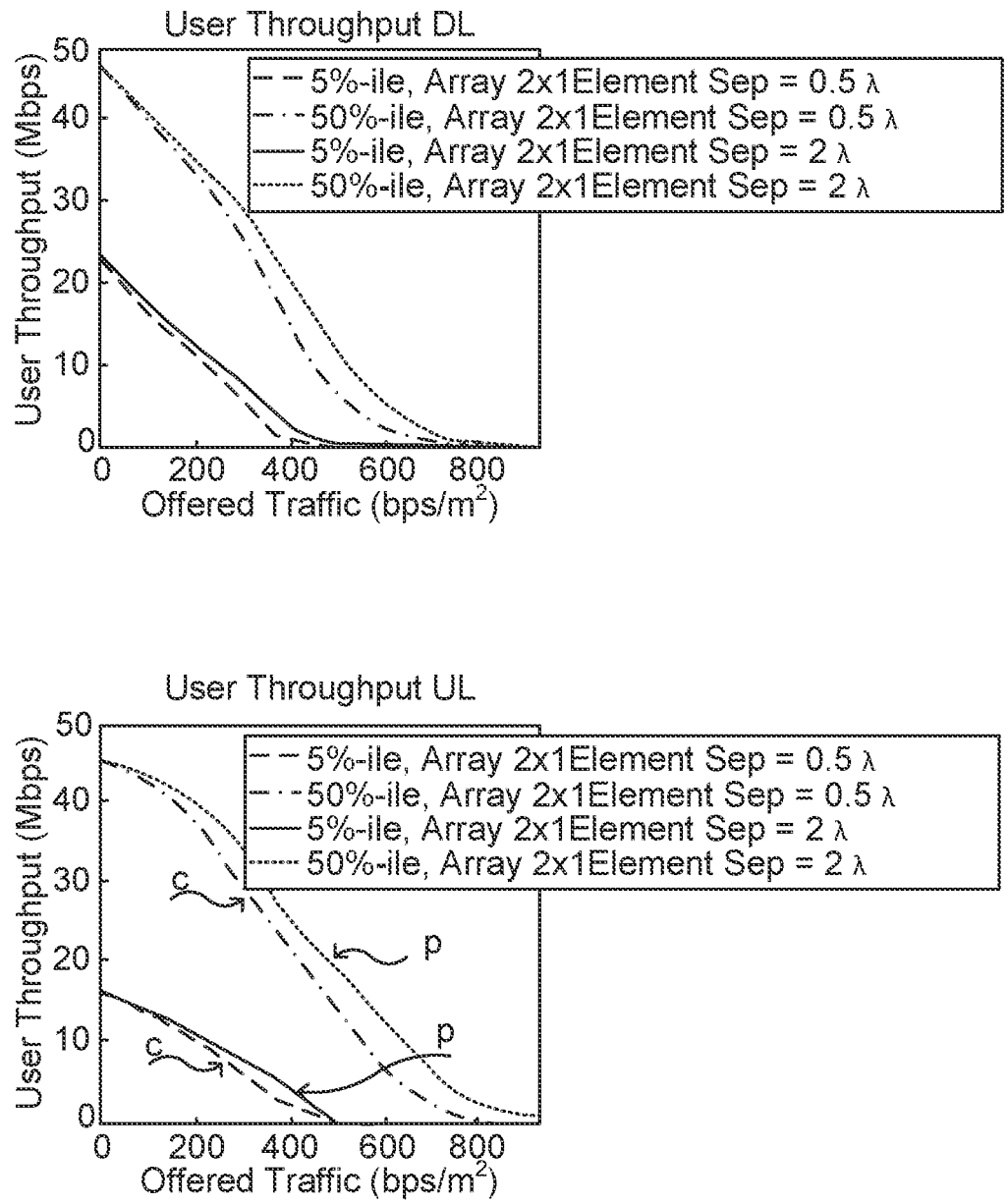
FIG. 6 illustrates simulation results on user throughput as function of offered traffic.

FIG. 6 illustrates the throughput for the respective case, now for a 2×1 antenna array, since only two antenna elements are now active. As in FIG. 4, the arrows denoted "c" indicate the results when using the conventional method, for 5%-ile and 50%-ile with antenna element separation of 0.5λ. The arrows denoted "p" indicate the results when using the herein proposed method, also for 5%-ile and 50%-ile with antenna element separation of 2λ. As can be seen, the proposed method again gives higher throughput than the conventional method for basically all traffic loads. Since the performance for the proposed method is higher compared to the conventional method it might be possible to turn off a higher number of elements with the proposed method while still maintaining a given performance requirement for the network. For example, assuming that the operator wants to have a certain throughput for the cell edge users (5%-ile user throughput); For the conventional method it might require five antenna elements to fulfill the required cell edge throughput at the current traffic load, while for the proposed method the requirement might be fulfilled with only four elements. In this case the proposed method may be used to save more energy compared to the conventional method. Hence, the proposed method could either be used to save the same amount of energy as the conventional method but increase the performance compared to conventional method or maintain similar performance but save more energy.

In the simulations (FIGS. 4 and 6) the antenna element separation was the same for all cells in the network. This might be sub-optimal, since each cell has most likely its own optimal antenna element separation, depending on for example how the base station is deployed, how the surroundings looks etc. Knowing in which angular span the serving UEs and the interfering UEs (i.e. UEs served by a neighboring base station and/or cell) are with respect to the serving base station can be used to decide appropriate element separation.

For instance, from the simulations it was evident that for macro base stations placed on top of buildings with vertical arrays the element separation should be large. The reason for this is that the angular span of the served UEs and interfering UEs were similar and rather narrow (i.e. the UEs were located rather densely). So in this case, with this antenna placement, it is better to use large element separation to generate a narrow UE-specific beam towards the served UEs since this results in less interference towards the interfering UEs. Further, since the angular span of the UEs was rather narrow the grating lobes that were created by the large element separation did not cause any further interference. Specifically, owing to the antenna placement on top of a building, the grating lobes were directed towards the sky, and did not cause interference towards the interfering UEs. Different base stations have different angular spans to the served and interfering UEs and hence, in some embodiments, individual element separations are used per base station when applying antenna muting, giving an additional advantage.

The proposed method may, for instance, be used for LTE, LTE evolution and NX.

Even though, in the examples above, both transmit and receive radio chains have been turned off in order to save energy, it is possible to, for instance, only turn off the transmit radio chain and keep the receive radio chain on. One reason for this could be that most of the energy will be saved by turning off the transmit radio chain due to their power amplifiers.

It is also possible to mute different elements in DL and UL if, for instance, the optimal element separation differs between DL and UL.

The antenna muting (turning off elements when traffic load allows) can be done both in a quick or slow time scale, from seconds up to hours.

The features and various embodiments that have been described can be combined in different ways, examples of which are given in the following.

Figure 7A:
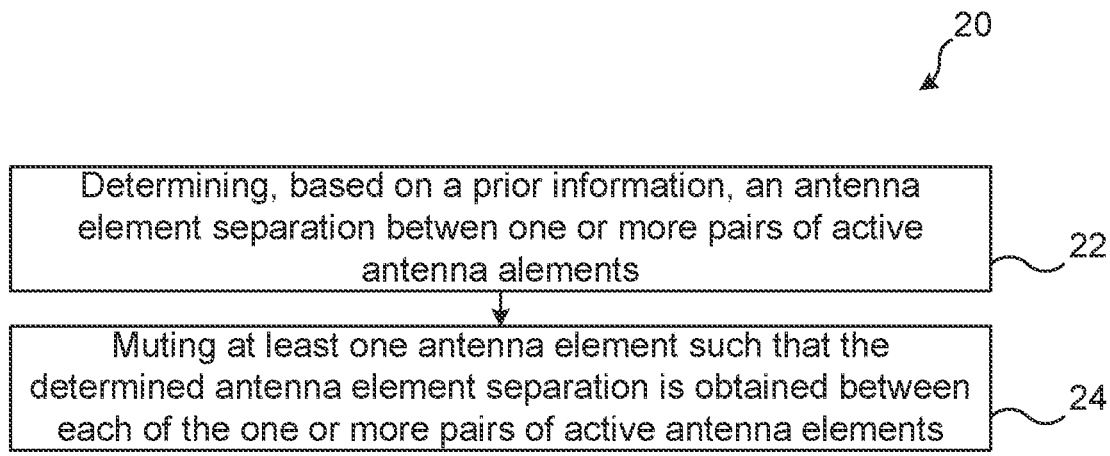
FIGS. 7a and 7b illustrate flow charts over steps of embodiments of the method in a network node in accordance with the present teachings.

FIG. 7a illustrates a flow chart over steps of an embodiment of a method 20 in a server device in accordance with the present teachings.

A method 20 is provided which may be performed in a network node 5, 9, 7 of a communication system 1 for muting antenna elements of an active antenna system 11. The method 20 comprises determining 22, based on a priori information relating to performance in the communication system 1, an antenna element separation between one or more pairs of active antenna elements of at least a subset of all active antenna elements of the active antenna system 11.

The method 20 further comprises muting 24 at least one antenna element such that the determined antenna element separation is obtained between each of the one or more pairs of active antenna elements of at least the subset of all active antenna elements.

In some embodiments the determined antenna element separation is to be obtained for all active antenna elements, while in other embodiments the determined element separation is to be obtained between two adjacent active antenna elements of a subset of all active antenna elements.

The method brings about several advantages. For instance, an advantage of the method is that system performance, e.g. in terms of energy savings and interference level, is improved compared to known methods for antenna element muting. For a given performance requirement (any KPI of a particular operator), a higher number of antenna elements can be muted compared to the known methods, and hence a higher reduction in energy consumption is achieved. Alternatively, a higher performance can be provided by the method with the same energy consumption when compared to the known method of muting antennas.

In this regards it is noted that the "a priori information" means information obtained beforehand about the performance in the communication system 1. The a priori known information, or simply a priori information, may for instance comprise fixed antenna separations corresponding to a certain load in the network node 5, 9, 7 in turn indicating how many active antenna elements would be needed, wherein the fixed antenna separations have been determined in dependence on deployment of the network nodes and active antenna system 11. The a priori known information may comprise amount of traffic that can be handled in the system for different number of active antenna elements. As still another example, the priori known information may comprise information about which antenna element separation has shown to be best for two or more different base stations.

In an embodiment, the method 20 comprises determining 23 a number of active antenna elements to mute such as to meet a performance requirement in the communication system 1 and wherein the muting 24 comprises muting the determined number of active antenna elements. That is, the number of currently active antenna elements to mute may be based on some performance requirement.

In some embodiments, the a priori information comprises a set of predetermined antenna element separations, and wherein the determining 22 the antenna element separation comprises selecting, among the set of predetermined antenna element separations, an antenna element setting best corresponding to a performance requirement in the communication system 1. The performance requirement may, for instance, comprise a certain user data rate to be provided, or channel quality.

In a variation of the above embodiment, the set of predetermined antenna element separations are based on statistics obtained for different antenna element separations during antenna element muting. As an example, statistics of an average user throughput may be gathered, or cell-edge user throughput or base station utilization.

In some embodiments, the active antenna system 11 provides coverage in at least a first cell C1, wherein the a priori information comprises information on measured interference for one or more radiation patterns for the active antenna system 11 and wherein the determining 22 the antenna element separation comprises determining the antenna element separation giving a radiation pattern minimizing interference towards communication devices outside the first cell C1.

In some embodiments, the active antenna system 11 provides coverage in at least a first cell C1, wherein the a priori information comprises information obtained on grating lobes of the active antenna system 11 and wherein the determining 22 the antenna element separation comprises determining the antenna element separation such that grating lobes of the resulting radiation fall outside an angular region of communication devices served outside the first cell C1. The a prior information relating to performance in the communication system may, in such embodiments, comprise information on grating lobes of resulting radiation for different antenna element separations.

In an embodiment, the method 20 comprises, prior to the determining 22 the antenna element separation, determining 21 a reduction in required number of active antenna elements of the active antenna system 11. The method 20 may thus be triggered by some indication that a reduction of the currently number of active antenna elements is possible. Such determining 21 may be performed in different ways. In one embodiment, the determining 21 the reduction in required number of active antenna comprises determining that a traffic load in the first cell C1 has reduced. This is an example of a clear indication that some antenna elements could be turned off while still serving the communication devices within the cell with a required performance.

In different embodiments, the muting 24 is performed for uplink, for downlink and/or separately for each cell C1, C2 of the communication system 1.

In different embodiments, the performance in the communication system 1 comprises one or more of: user throughput in uplink, user throughput in downlink, throughput in uplink for cell-edge user and throughput in downlink for cell-edge user, network node 5, 9, 7 utilization and a maximum power consumption threshold.

Figure 7B:
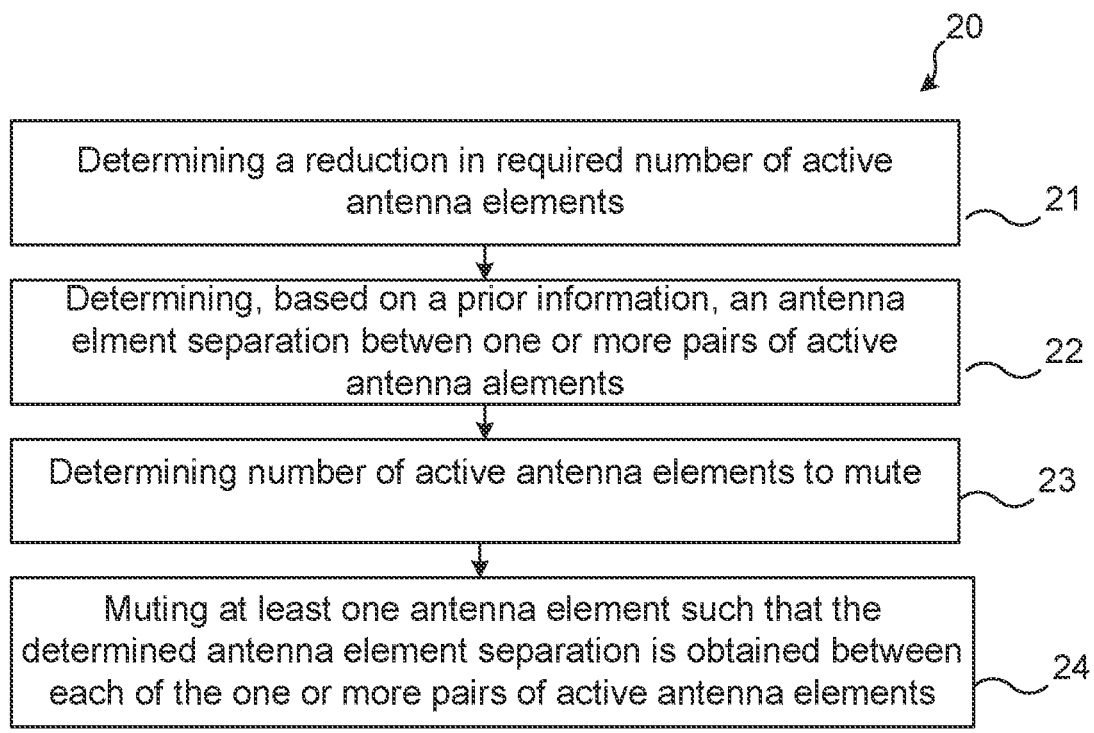

FIG. 7*b* illustrates another embodiment of the method 20, and gives an example on how to combine the different features and embodiments that have been described. In particular, in this embodiment the method 20 comprises determining 21 a reduction in required number of active antenna elements of the active antenna system 11. The determination may be performed in any manner that has been described, e.g. by detecting that the load in the communication system 1, or the load in a certain network node 5 thereof, has reduced and that the required number of active antenna elements may therefore be reduced, without affecting the providing of requested services in the communication system 1 or in a cell C1 provided by the network node 5.

The method 20 further comprises, in this embodiment, determining 22, based on a priori information relating to performance in the communication system 1, an antenna element separation between one or more pairs of active antenna elements of at least a subset of all active antenna elements of the active antenna system 11.

The method 20 further comprises, in this embodiment, determining 23 a number of active antenna elements to mute such as to meet a performance requirement in the communication system 1 and wherein the muting 24 comprises muting the determined number of active antenna elements.

The method 20 further comprises, in this embodiment, muting 24 at least one antenna element such that the determined antenna element separation is obtained between each of the one or more pairs of active antenna elements of at least the subset of all active antenna elements.

The method 20 may comprise determining an antenna element separation between two active antenna elements, such that the antenna element separation results in a radiation meeting a performance requirement, and then muting at least one antenna element such that the determined antenna element separation is obtained between each of one or more pairs of active antenna elements of at least a subset of all active antenna elements.

Figure 8:
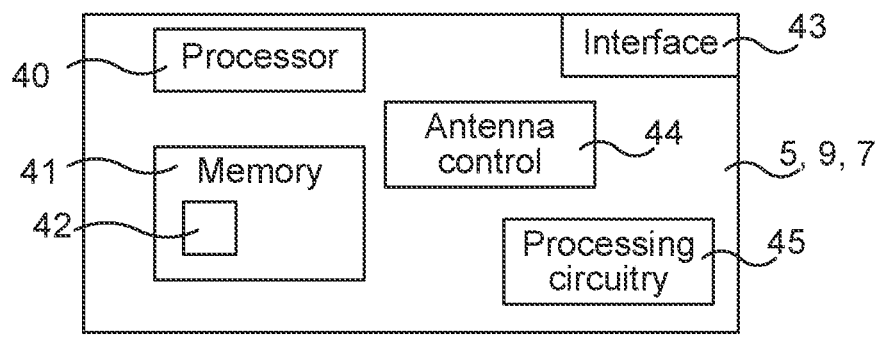
FIG. 8 illustrates schematically a network node and means for implementing embodiments according to the present teachings.

FIG. 8 illustrates schematically a network node and means for implementing embodiments according to the present teachings.

The network node 5, 9, 7 comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method 20 for instance as described in relation to FIG. 7*a* or FIG. 7*b*.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The network node 5, 9, 7 comprises an interface 43 for communication with other network node and/or with communication devices. The interface 43 may, for instance, comprise an interface e.g. protocol stacks etc., for communication with wireless communication devices, e.g. an UE, and also an interface, e.g. protocol stacks etc. for communication with other network nodes.

The network node 5, 9, 7 may comprise an antenna control device 44 for, for instance, controlling antenna elements of an active antenna system 11. The antenna control device 44 may comprise control circuitry for controlling the active antenna system 11, to which is may be connected e.g. in a wired fashion. Such control circuitry may be adapted to mute and activate specific antenna elements of the active antenna system 11, to determine how many and which antenna elements to mute or activate etc.

The network node 5, 9, 7 may comprise additional processing circuitry, schematically indicated at reference numerals 45 for implementing the various embodiments according to the present teachings.

A network node 5, 9, 7 of a communication system 1 is provided for muting antenna elements of an active antenna system 11. The network node 5, 9, 7 is configured to: determine, based on a priori information relating to performance in the communication system 1, an antenna element separation between one or more pairs of active antenna elements of at least a subset of all active antenna elements of the active antenna system 11, and mute at least one antenna element such that the determined antenna element separation is obtained between each of the one or more pairs of active antenna elements of at least the subset of all active antenna elements.

The network node 5, 9, 7 may be configured to perform the above steps e.g. by comprising one or more processors 40 and memory 41, the memory 41 containing instructions executable by the processor 40, whereby the network node 5, 9, 7 is operative to perform the steps.

In an embodiment, the network node 5, 9, 7 is configured to determine a number of active antenna elements to mute such as to meet a performance requirement in the communication system 1 and configured to mute by muting the hence determined number of active antenna elements.

In an embodiment, the a priori information comprises a set of predetermined antenna element separations, and the network node 5, 9, 7 is configured to determine the antenna element separation by selecting, among the set of predetermined antenna element separations, an antenna element setting best corresponding to a performance requirement in the communication system 1.

In an embodiment, the set of predetermined antenna element separations are based on statistics obtained for different antenna element separations during antenna element muting.

In an embodiment, the active antenna system 11 provides coverage in at least a first cell C1, and the a priori information comprises information on measured interference for one or more radiation patterns for the active antenna system 11 and wherein the network node 5, 9, 7 is configured to determine the antenna element separation by determining the antenna element separation giving a radiation pattern minimizing interference towards communication devices outside the first cell C1.

In an embodiment, the active antenna system 11 provides coverage in at least a first cell C1, and the a priori information comprises information obtained on grating lobes of the active antenna system 11 and wherein the network node 5, 9, 7 is configured to determine the antenna element separation by determining the antenna element separation such that grating lobes of the resulting radiation fall outside an angular region of communication devices served outside the first cell C1.

In an embodiment, the network node 5, 9, 7 is configured to, prior to the determining the antenna element separation, determine a reduction in required number of active antenna elements of the active antenna system 11.

In an embodiment, the network node 5, 9, 7 is configured to determine the reduction in required number of active antenna by determining that a traffic load in the first cell C1 has reduced.

In an embodiment, the network node 5, 9, 7 is configured to mute for uplink, for downlink and/or separately for each cell C1, C2 of the communication system 1.

In various embodiments, the performance requirement comprises one of: user throughput in uplink, user throughput in downlink, throughput in uplink for cell-edge user and throughput in downlink for cell-edge user, network node 5, 9, 7 utilization and a maximum power consumption threshold.

In an embodiment, a network node of a communication system is provided for muting antenna elements of an active antenna system. The network node comprises one or more processors and memory, the memory containing instructions executable by the processor, whereby the network node is operative to: determine, based on a priori information relating to performance in the communication system, an antenna element separation between one or more pairs of active antenna elements of at least a subset of all active antenna elements of the active antenna system, and mute at least one antenna element such that the determined antenna element separation is obtained between each of the one or more pairs of active antenna elements of at least the subset of all active antenna elements.

The present teachings also encompass a computer program 42 for a network node 5, 9, 7 for muting antenna elements of an active antenna system. The computer program 42 comprises computer program code, which, when executed on at least one processor on the network node 5, 9, 7 causes the network node 5, 9, 7 to perform the method 20 according to any of the described embodiments.

The present teachings also encompasses computer program products 41 comprising a computer program 42 for implementing the embodiments of the method as described, and a computer readable means on which the computer program 42 is stored. The computer program product, or the memory, thus comprises instructions executable by the processor 40. Such instructions may be comprised in a computer program, or in one or more software modules or function modules. The computer program product 41 may be any combination of random access memory (RAM) or read only memory (ROM), Flash memory, magnetic tape, Compact Disc (CD)-ROM, digital versatile disc (DVD), Blu-ray disc etc.

Figure 9:
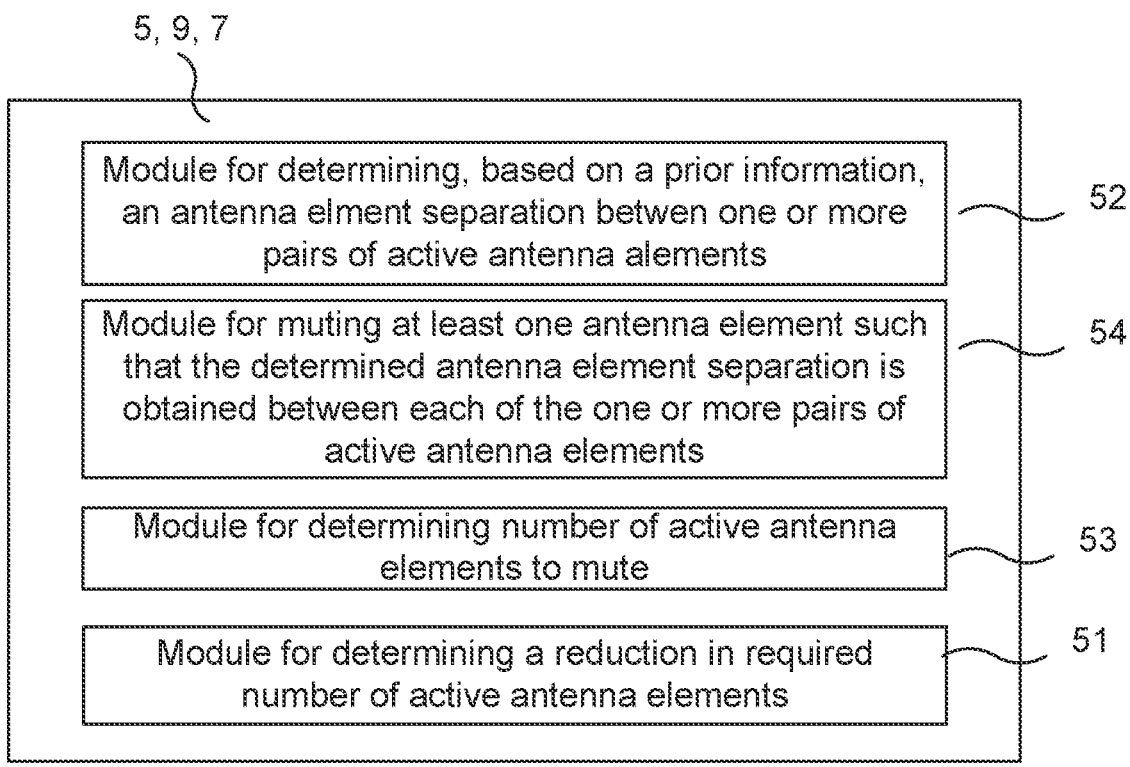
FIG. 9 illustrates a network node comprising function modules/software modules for implementing embodiments according to the present teachings.

FIG. 9 illustrates a network node comprising function modules/software modules for implementing embodiments according to the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described.

A network node is provided for muting antenna elements of an active antenna system. The network node comprises a first module 52 determining, based on a priori information relating to performance of the communication system 1, an antenna element separation between one or more pairs of active antenna elements of at least a subset of all active antenna elements of the active antenna system 11. Such first module 52 may, for instance, comprise processing circuitry adapted to determine an antenna element separation based on a priori known information.

The network node comprises a second module 54 for muting at least one antenna element such that the determined antenna element separation is obtained between each of the one or more pairs of active antenna elements of at least the subset of all active antenna elements. Such second module 54 may, for instance, comprise processing circuitry adapted to inhibit signals from being sent from the antenna element to be muted. The second module 54, may as another example, comprise processing circuitry adapted to send a control signal for turning the radio chain on or off.

The network node may comprise additional function modules for implementing the embodiments according to the present teachings. The network node may, for instance, comprise a third function module 51 for determining 21 a reduction in required number of active antenna elements of the active antenna system 11. Such third function module 51 may, for instance, comprise processing circuitry adapted to determine the reduction in required number of active antenna elements. The processing circuitry may for instance be adapted to detect current network load and use network load thresholds corresponding to a required number of active antenna elements for the determination.

As another example, the network node may comprise a fourth function module 93 for determining 23 a number of active antenna elements to mute such as to meet a performance requirement in the communication system 1. Such fourth function module 93 may, for instance, comprise processing circuitry adapted for such determination.

It is noted that one or more of the modules 52, 54, 51, 53 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A network node of a communication system for muting antenna elements of an active antenna system comprising M antenna elements wherein each adjacent pair of antenna elements is separated by a first antenna element separation, the network node being configured to:
obtain information relating to performance in the communication system dependent on antenna element separation, wherein:
the information comprises a set of performance data points,
each performance data point being associated with an antenna element separation, and
further wherein the set of performance data points comprises:
a first performance data point indicating a performance of the first antenna element separation for a first traffic load; and
a second performance data point indicating a performance of the second antenna element separation for the first traffic load, the second antenna element separation being greater than the first antenna element separation;
based on the first and second performance data points, determining that the second antenna element separation is expected to provide a greater performance than the first antenna element separation; and
in response to determining that the second antenna element separation is expected to provide a greater performance than the first antenna element separation, select a set of N of the M antenna elements to mute and mute the selected set of N antenna elements, wherein, after said muting, each adjacent pair of non-muted antenna elements is separated by the second antenna element separation.

2. The network node of claim 1, wherein the network node is further configured such that, after muting the N antenna elements, the network node:
uses the non-muted antenna elements to communicate with one or more user equipments (UEs), but refrains from using any of the muted antenna elements to communicate with the one or more UEs.

3. The network node of claim 2, wherein
the first performance data point indicates: a first user throughput in uplink for the first traffic load, a first user throughput in downlink for the first traffic load, a first throughput in uplink for cell-edge for the first traffic load, a first throughput in downlink for cell-edge user for the first traffic load, or a first antenna power consumption for the first traffic load, and
the second performance data point indicates: a second user throughput in uplink for the first traffic load, a second user throughput in downlink for the first traffic load, a second throughput in uplink for cell-edge for the first traffic load, a second throughput in downlink for cell-edge user for the first traffic load, or a second an antenna power consumption for the first traffic load.

4. The network node of claim 3, wherein
the set of performance data points further comprises:
a third performance data point for the first antenna element separation; and
a fourth performance data point for the second antenna element separation,
the third performance data point indicates: a third user throughput in uplink for a second traffic load, a third user throughput in downlink for the second traffic load, a third throughput in uplink for cell-edge for the second traffic load, a third throughput in downlink for cell-edge user for the second traffic load, or a third an antenna power consumption for the second traffic load, and
the fourth performance data point indicates: a fourth user throughput in uplink for the second traffic load, a fourth user throughput in downlink for the second traffic load, a fourth throughput in uplink for cell-edge for the second traffic load, a fourth throughput in downlink for cell-edge user for the second traffic load, or a fourth an antenna power consumption for the second traffic load.

5. The network node of claim 4, wherein the network node determines the number of active antenna elements to mute based on the second antenna element separation and M.

6. The network node of claim 1, wherein
determining that the second antenna element separation is expected to provide a greater performance than the first antenna element separation comprises determining that the second antenna element separation is expected to produce less interference than the first antenna element separation.

7. The network node of claim 1, wherein
determining that the second antenna element separation is expected to provide a greater performance than the first antenna element separation comprises determining that the second antenna element separation is expected to produce grating lobes falling outside an angular region.

8. The network node of claim 1, wherein
the M antenna elements are aligned along a straight line, N=floor (M/2), and
s2=2 (s1), where s2 is the second antenna element separation and s1 is the first antenna element separation.

9. A method performed by a network node of a communication system for muting antenna elements of an active antenna system comprising M antenna elements wherein each adjacent pair of antenna elements is separated by a first antenna element separation, the method comprising:
obtaining information relating to performance in the communication system dependent on antenna element separation, wherein the information comprises a set of performance data points, each performance data point being associated with an antenna element separation, and further wherein the set of performance data points comprises a first performance data point indicating a performance of the first antenna element separation for a first traffic load and a second performance data point indicating a performance of a second antenna element separation for the first traffic load, the second antenna element separation being greater than the first antenna element separation;
based on the first and second performance data points, determining that the second antenna element separation is expected to provide a greater performance than the first antenna element separation; and in response to determining that the second antenna element separation is expected to provide a greater performance than the first antenna element separation, selecting a set of N of the M antenna elements to mute and muting the selected set of N antenna elements, wherein after muting the selected set of N antenna elements, each adjacent pair of non-muted antenna elements is separated by the second antenna element separation.

10. The method of claim 9, further comprising, after muting the N antenna elements using the non-muted antenna elements to communicate with one or more user equipments (UEs), but refraining from using any of the muted antenna elements to communicate with the one or more UEs, wherein
each of the first performance data point and the second performance data point indicates: a user throughput in uplink, a user throughput in downlink, a throughput in uplink for cell-edge, a throughput in downlink for cell-edge user, or an antenna power consumption.

11. The method of claim 9, further comprising, in response to determining that the second antenna element separation is expected to provide a greater performance than the first antenna element separation, determining a number of active antenna elements to mute to meet a performance requirement in the communication system and the determined number is N.

12. The method of claim 9, wherein the network node determines the number of active antenna elements to mute based on the second antenna element separation and M.

13. The method of claim 9, wherein
determining that the second antenna element separation is expected to provide a greater performance than the first antenna element separation comprises determining that the second antenna element separation is expected to produce less interference than the first antenna element separation.

14. The method of claim 9, wherein
determining that the second antenna element separation is expected to provide a greater performance than the first antenna element separation comprises determining that the second antenna element separation is expected to produce grating lobes falling outside an angular region.

15. The method of claim 9, wherein
the M antenna elements are aligned along a straight line, N=floor (M/2), and
s2=2 (s1), where s2 is the second antenna element separation and s1 is the first antenna element separation.

16. A non-transitory computer readable storage medium storing a computer program for configuring a network node to perform the method of claim 9.

* * * * *